UNITED STATES PATENT OFFICE.

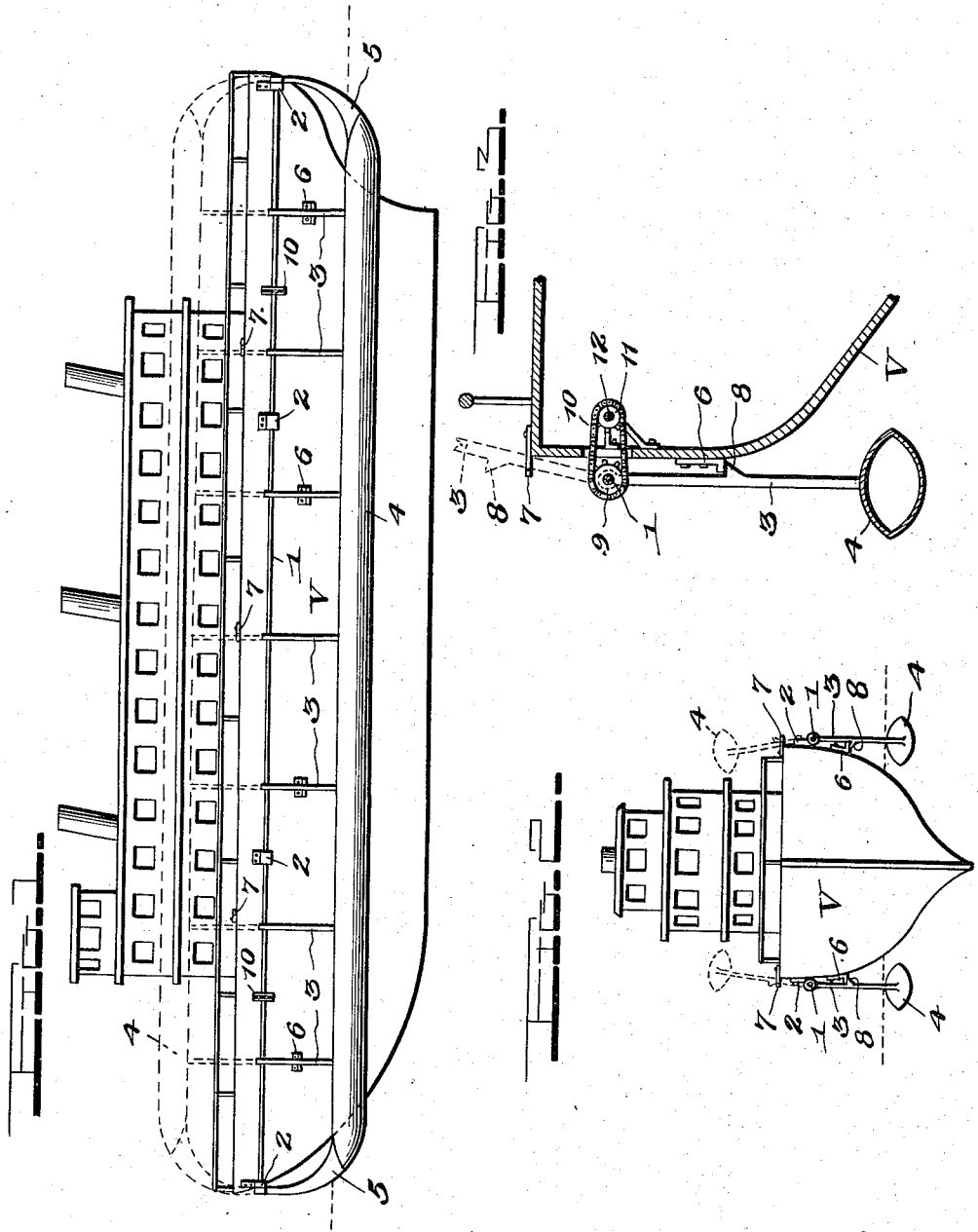

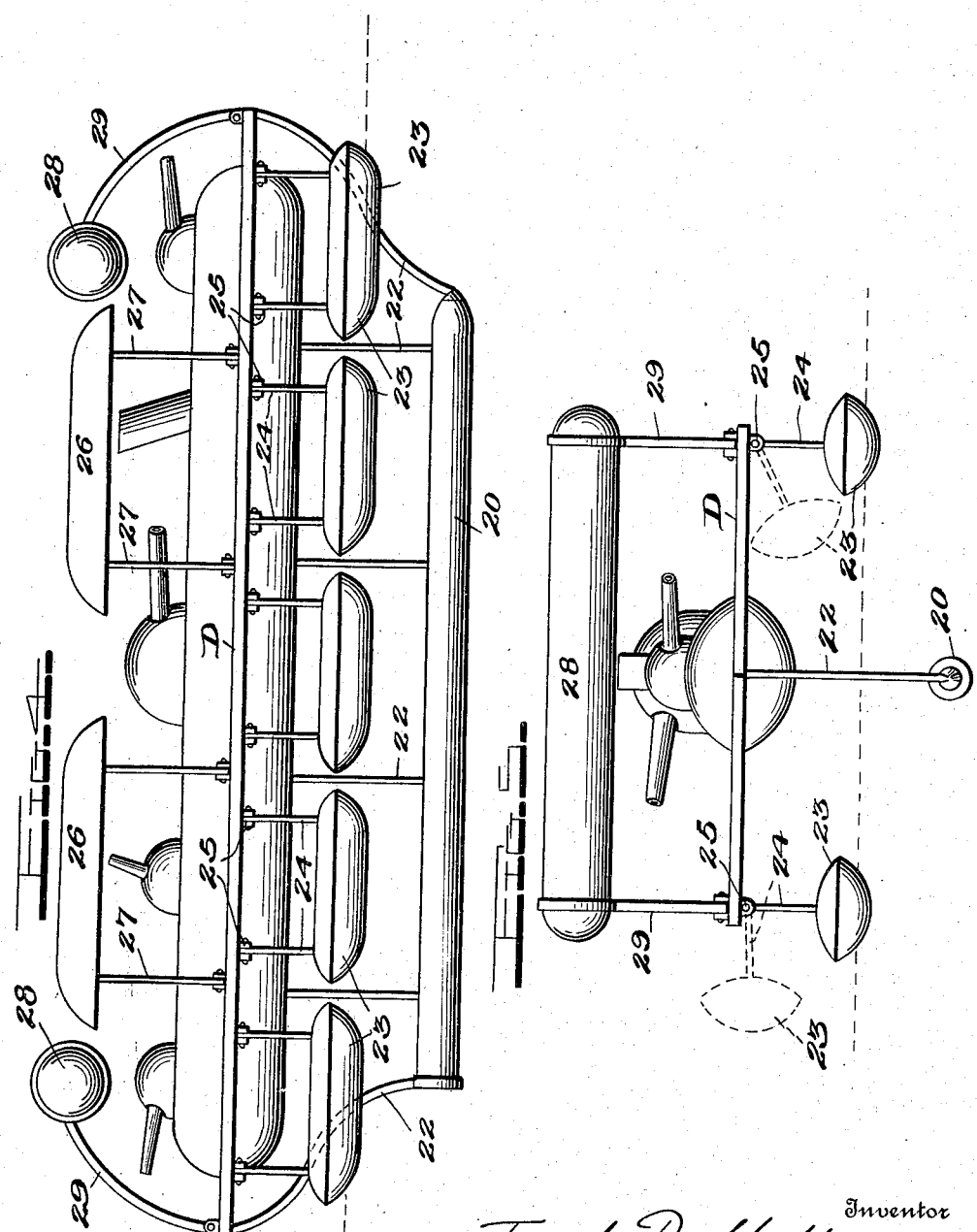

FRANK R. STAFFORD, OF PROVIDENCE, RHODE ISLAND.

VESSEL.

1,217,522.      Specification of Letters Patent.      Patented Feb. 27, 1917.

Application filed July 26, 1915. Serial No. 42,022.

*To all whom it may concern:*

Be it known that I, FRANK R. STAFFORD, a citizen of the United States, residing at Providence, in the county of Providence and State of Rhode Island, have invented a new and useful Improvement in Vessels, of which the following is a specification.

This invention relates to certain new and useful improvements in vessels and the primary object thereof is to provide a vessel which is equipped with movable floats, the latter being normally out of water engaging position, but being readily movable to such position upon necessity, for instance upon the vessel springing a leak due to any cause whatever, so as to prevent sinking or capsizing of the vessel.

A further object of the invention is to provide a vessel to permit the passage therepast of a torpedo sent against the vessel without causing explosion of the torpedo.

A still further object of the invention is to provide simple and inexpensive means for operating the floats from inoperative to operative positions.

Other and further objects will be later herein set forth and of themselves manifested in the course of the following description.

In the drawings—

Figure 1 is a side elevation of a vessel provided with the present invention.

Fig. 2 is an end elevation.

Fig. 3 is an enlarged detail sectional view showing the float raising and lowering means.

Fig. 4 is a side elevation of a vessel constructed to permit the passage therepast of torpedoes.

Fig. 5 is an end elevation of Fig. 4.

In proceeding in accordance with the present invention, a vessel generally, designated V in the drawings, is provided along each side thereof with a shaft 1 which may or may not extend throughout the entire length of the vessel and is journaled in a suitable number of brackets 2, secured to the vessel sides.

Rigidly secured at their inner ends to the shaft 1 are a series of arms 3 to the outer ends of which a float 4 is connected, the ends of the float being also connected to the shaft 1 by means of curved end arms 5 as depicted in Fig. 1 of the drawings.

Stops or abutments 6 are secured to the vessel sides so as to engage the arms 3 between the ends of the latter upon lowering of the arms and therewith the float from the dotted to the full line position shown in Fig. 3 of the drawings. Catches 7 may be secured to the deck of the vessel and utilized to engage the arms 3 when the float is in up or raised position. The arms 3 preferably are formed with shoulders 8 to engage beneath the brackets 6 so as to take or assume some of the strain imposed upon the shaft 1, and its brackets when the float is being used.

For the purpose of operating the float to move same from one position thereof to the other, shaft 1 is provided with one or more sprocket wheels 9 over which an endless sprocket chain 10 passes, the latter also passing over sprocket wheels 11 mounted on a shaft 12, which latter is preferably located below deck, and may be operated in any desired manner, or from any source of power.

In operation, it will be understood that the floats are normally above deck, or held in up position, and upon necessity arising for their use, the chain is caused to move to rotate shaft 1 to move the floats from the dotted to the full line position of Figs. 1, 2 and 3.

In Figs. 4 and 5 of the drawings a war or fighting vessel is shown in which the hull thereof at the keel is formed of open-work character, *i. e.*, the bulb-like keel 20 is supported by means of open bracket work 22, and the side floats 23 are arranged in series, the floats of each series being independently mounted on arms 24 pivoted at 25, the float 23 being swingable beneath the deck D as depicted in dotted lines in Fig. 5, so that should a torpedo strike one of the floats 23, or more than one of same the float will not resist the torpedo, but will pass the same upon lifting the float, and will repeat at the opposite side of the vessel should one or more of the floats on said opposite side be struck by the torpedo.

Upper emergency floats 26 at the sides of the vessel are mounted for swinging movement on arms 27, the latter being pivoted to the deck D, while similar end floats 28 are swingingly supported by curved arms 29 at the bow and stern of the vessel, these floats 26 and 28 being used in event of the vessel being in danger of sinking or capsizing for any reason.

Having thus described my invention, what I claim as new and desire to secure by Letters Patent is:—

1. In combination with a vessel, a float arranged on each side thereof, arms pivoted at their inner ends to the vessel and at their outer ends being connected to the float, a sprocket connected to the pivot of the arms, a driving sprocket, an endless chain connecting said sprockets, latches to engage the arms to hold the latter in up position, shoulders on the arms between their ends and stops on the sides of the vessel beneath which the shoulders engage.

2. In combination with a vessel, a float on each side thereof, arms pivoted to the vessel and connected to the floats, means to raise and lower the floats, means to positively engage and lock the arms in raised inoperative position, and means between the arms and vessel to brace the arms from the vessel when the floats are in operative position.

3. In combination with a vessel, a float on each side thereof, arms pivoted to the vessel and connected to the floats, means to raise and lower the floats, and means between the vessel and arms which upon movement of the arms to operative position automatically braces the arms from the vessel.

4. In combination with a vessel, emergency floats on the sides thereof, means to connect the floats to the vessel so that the floats may be normally held in a vertical position extending above the deck of the vessel and lowered at will for use in sustaining the vessel afloat.

In testimony whereof I have signed my name to this specification in the presence of two subscribing witnesses.

FRANK R. STAFFORD.

Witnesses:
 ADA E. HAGERTY,
 J. A. MILLER.

Copies of this patent may be obtained for five cents each, by addressing the "Commissioner of Patents, Washington, D. C."